US011077729B2

(12) United States Patent
Zhang et al.

(10) Patent No.: US 11,077,729 B2
(45) Date of Patent: Aug. 3, 2021

(54) SYSTEM AND METHOD FOR TRAILER HEIGHT ADJUSTMENT

(71) Applicant: Ford Global Technologies, LLC, Dearborn, MI (US)

(72) Inventors: Chen Zhang, San Jose, CA (US); Mark Davison, Dearborn, MI (US); Yu Ling, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 16/019,002

(22) Filed: Jun. 26, 2018

(65) Prior Publication Data

US 2019/0389261 A1 Dec. 26, 2019

(51) Int. Cl.
| | |
|---|---|
| *B60D 1/36* | (2006.01) |
| *B60D 1/46* | (2006.01) |
| *B60Q 9/00* | (2006.01) |
| *B60W 50/14* | (2020.01) |
| *B60W 30/18* | (2012.01) |
| *B60D 1/06* | (2006.01) |

(52) U.S. Cl.
CPC ............... *B60D 1/36* (2013.01); *B60D 1/46* (2013.01); *B60Q 9/00* (2013.01); *B60W 30/18009* (2013.01); *B60W 50/14* (2013.01); *B60D 1/06* (2013.01); *B60W 2050/143* (2013.01); *B60W 2050/146* (2013.01)

(58) Field of Classification Search
CPC .. B60R 1/003; B60D 1/36; B60D 1/46; B60D 1/366; B60D 1/06
See application file for complete search history.

(56) References Cited

U.S. PATENT DOCUMENTS

| | | | |
|---|---|---|---|
| 9,102,271 B2 | 8/2015 | Trombley et al. | |
| 9,434,381 B2 | 9/2016 | Windeler | |
| 9,457,632 B1 | 10/2016 | Windeler et al. | |
| 9,499,018 B2* | 11/2016 | Gehrke | B60D 1/36 |
| 2006/0293800 A1 | 12/2006 | Bauer et al. | |
| 2012/0024081 A1* | 2/2012 | Baker | G01L 5/136 |
| | | | 73/862.338 |
| 2015/0115571 A1 | 4/2015 | Zhang et al. | |
| 2016/0185169 A1 | 6/2016 | Strand | |
| 2016/0304122 A1* | 10/2016 | Herzog | B60D 1/36 |
| 2017/0158007 A1 | 6/2017 | Lavoie | |
| 2018/0039278 A1* | 2/2018 | Huger | G06T 7/70 |
| 2018/0081370 A1* | 3/2018 | Miller | B60W 10/04 |

(Continued)

FOREIGN PATENT DOCUMENTS

| | | |
|---|---|---|
| DE | 102004008928 A1 | 9/2005 |
| DE | 102014114078 A1 | 4/2015 |
| DE | 102014110498 A1 | 1/2016 |

(Continued)

*Primary Examiner* — Anshul Sood
(74) *Attorney, Agent, or Firm* — Raymond Coppiellie; Price Heneveld LLP (57) ABSTRACT

A vehicle system comprises a hitch ball mounted on a vehicle and a controller configured to identify a coupler position of a trailer. The controller is further configured to control motion of the vehicle aligning the hitch ball with the coupler position and monitor a height of the coupler relative to the hitch ball. In response to the coupler height being less than a height of the hitch ball, the controller is configured to stop the motion of the vehicle.

16 Claims, 7 Drawing Sheets

(56) References Cited

U.S. PATENT DOCUMENTS

2018/0215382 A1\* 8/2018 Gupta ................... G08G 1/165
2018/0312022 A1 11/2018 Mattern et al.

FOREIGN PATENT DOCUMENTS

| DE | 102015213404 A1 | 1/2017 |
| DE | 102016123600 A1 | 6/2017 |
| WO | 2015005795 A2 | 1/2015 |

\* cited by examiner

SYSTEM AND METHOD FOR TRAILER HEIGHT ADJUSTMENT

FIELD OF THE DISCLOSURE

The present disclosure generally relates to a system for assisting in a vehicle-trailer hitching operation. In particular, the present system relates to a system and method configured to assist in a height adjustment of a trailer.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a vehicle system is disclosed. The system comprises a hitch ball mounted on a vehicle and a controller configured to identify a coupler position of a trailer. The controller is further configured to control motion of the vehicle aligning the hitch ball with the coupler position and monitor a height of the coupler relative to the hitch ball. In response to the coupler height being less than a height of the hitch ball, the controller is configured to stop the motion of the vehicle.

Embodiments of the first aspect of the invention can include any one or a combination of the following features:
  the controller is configured to stop the vehicle at a predetermined distance from the trailer;
  an indication device, wherein a controller is configured to control the indication device to output a notification configured to indicate the height of the coupler;
  the controller is in communication with a portable device and configured to wirelessly communicate the notification for display on a screen of the portable device;
  the controller is further configured to monitor the height of the coupler during a manual adjustment of the height;
  the controller is configured to output an indication that the height of the coupler is compatible with the hitch ball for connection in response to the manual adjustment;
  the controller is configured to control motion of the vehicle completing the alignment in response to receiving an input indicating that the manual adjustment is complete;
  the controller is configured to control motion of the vehicle completing the alignment of the hitch ball with the coupler position in response to identifying that the height of the coupler is compatible with the hitch ball for connection;
  the indication device comprises a display screen in communication with the controller, wherein the controller is configured to display an instruction indicating the height of the coupler relative to the hitch ball on the display screen;
  the indication device comprises at least one of a light source, an audible apparatus, and a display screen;
  a sensor apparatus in communication with the controller, wherein the sensor apparatus is configured to scan a region proximate the vehicle and detect the coupler position of a coupler of the trailer; and
  the sensor apparatus comprises an imaging system including one or more cameras mounted on the vehicle, wherein the controller identifies the coupler position based on image data received from the imaging system comprising position data of the coupler.

According to another aspect of the present disclosure, a method for controlling a vehicle is disclosed. The method comprises identifying a coupler position including a coupler height of a trailer in sensor data and controlling motion of the vehicle aligning the hitch ball with the coupler position. The method further comprises stopping the motion of the vehicle at a predetermined distance from the coupler position and outputting an instruction for adjusting the coupler height. The method further includes monitoring the coupler height and identifying a height compatibility between a vehicle hitch and the coupler.

According to another aspect of the present disclosure, a vehicle system is disclosed. The system comprises a hitch ball mounted on a vehicle, a sensor system configured to capture sensor data comprising a coupler position of a trailer, and an indication device. A controller is configured to identify the coupler position from the sensor system and control motion of the vehicle aligning the hitch ball with the coupler position. The controller is further configured to monitor a height of the coupler relative to the hitch ball and stop the motion of the vehicle in response to the coupler height being less than a height of the hitch ball. The controller is further configured to control the indication device to output a notification configured to identify the height of the coupler being compatible to connect the coupler to the hitch ball.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
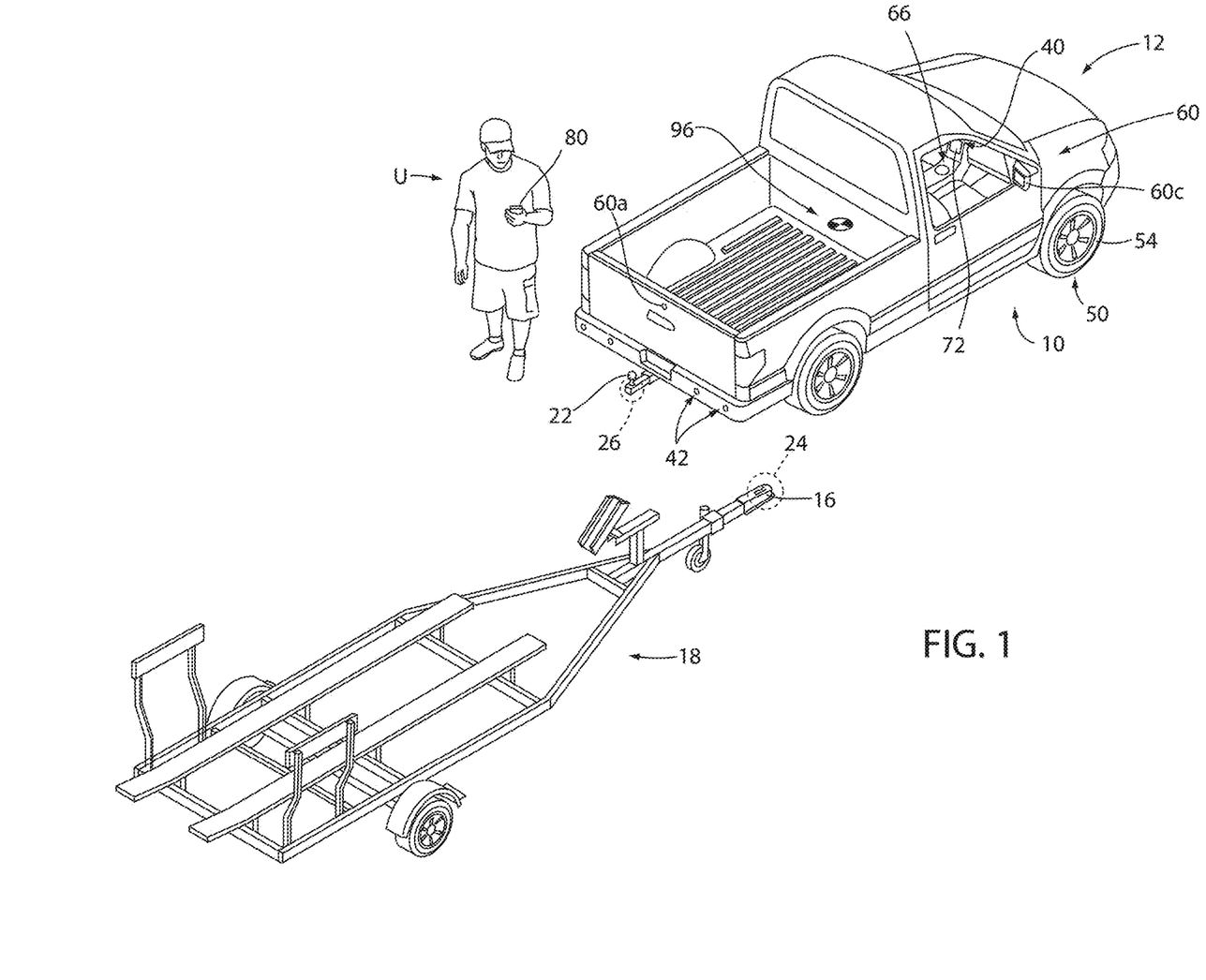
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Referring generally to FIGS. 1-6, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

Figure 6:
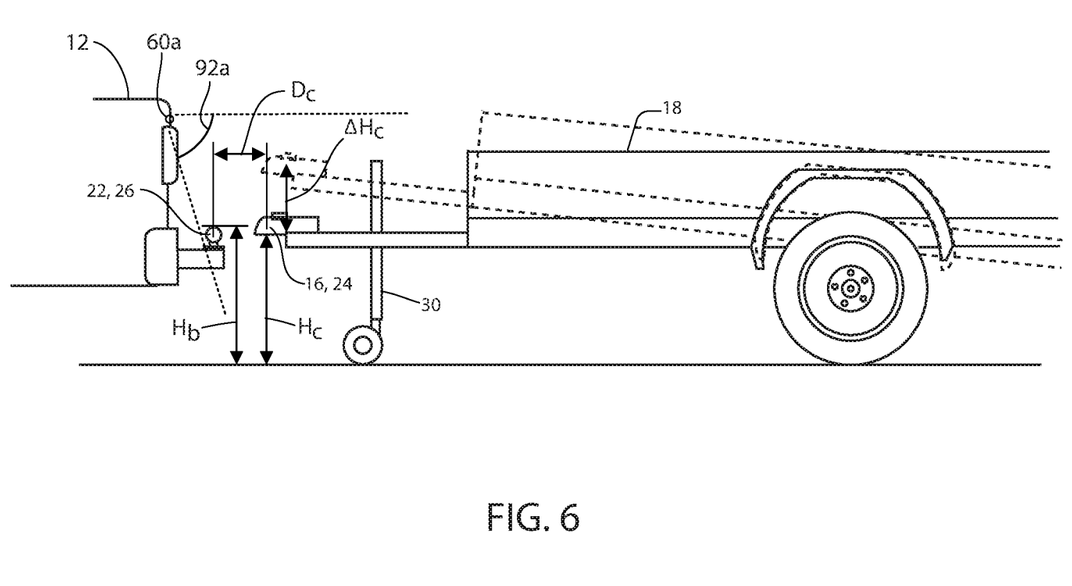
FIG. 6 is a side view demonstrating a height of a coupler in relation to a height of a hitch ball of the vehicle.

In some embodiments, the hitch assist system 10 may be configured to communicate instructions and/or provide feedback to the user U in relation to various aspects of operation of the vehicle 12 and the attachment of the coupler 16 to the hitch ball 22. In an exemplary embodiment, the controller 14 of the system may communicate messages, alerts, or various forms of feedback to the user U providing instruction to adjust a height $H_c$ of the coupler 16 to be compatible for attachment to the hitch ball 22. The height $H_c$ of the coupler 16 and a height $H_b$ of the hitch ball 22 are shown in FIG. 6. Accordingly, the controller 14 may be configured to output instructions, indications, alerts, and/or commands configured to instruct or control an adjustment of the height $H_c$ of the coupler 16 to clear the height $H_b$ of the hitch ball 22. In this way, the system 10 may be configured to identify the height $H_c$ of the coupler 16 and monitor the height $H_c$ for changes. As discussed herein, a change $\Delta H_c$ in the height of the coupler 16 may result from a manual or automated (e.g., powered, electronic, etc.) adjustment of a trailer jack 30.

During a height adjustment routine, the controller may be configured to control or instruct the user U to position the trailer jack 30 such that the coupler 16 may engage the hitch ball 22. In response to the height $H_c$ of the coupler 16 being greater than the height $H_b$ of the hitch ball 22, the controller 14 may be configured to control or output an instruction to stop the adjustment of the trailer jack 30. For example, in response to identifying that the height $H_c$ of the coupler 16 is sufficient to engage the hitch ball 22, the controller 14 may control one or more devices to provide indications or feedback regarding the height $H_c$ of the coupler 16 and the related clearance of the height $H_b$ of the hitch ball 22. Further detailed discussion of the height adjustment of the trailer jack 30 as well as the devices by which the controller 14 may control or output indications of the height $H_c$ of the coupler 16 are discussed further in reference to FIGS. 5-7.

Figure 2:
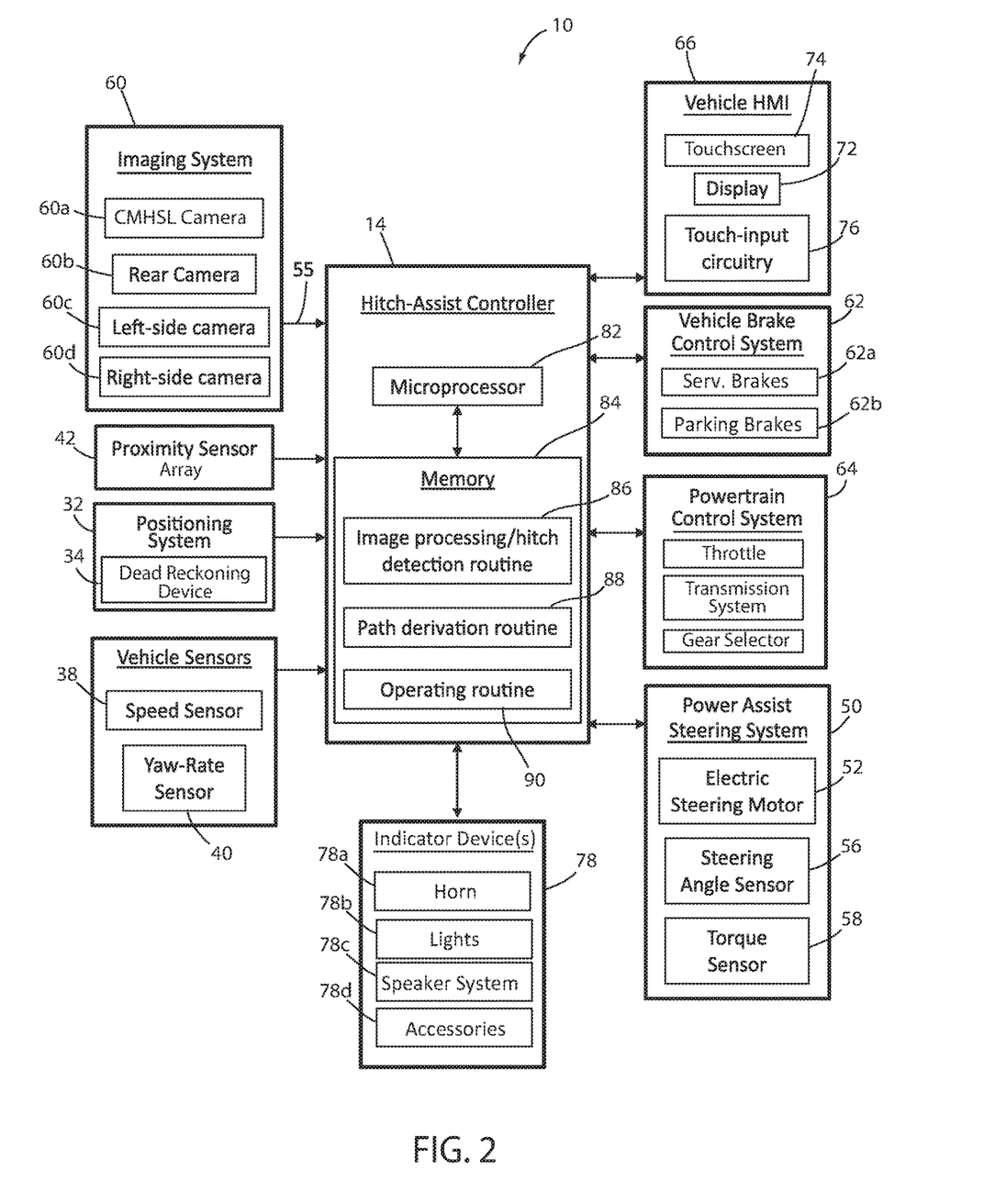
FIG. 2 is a diagram of a system according to an aspect of the disclosure for assisting in aligning the vehicle with a trailer in a position for hitching the trailer to the vehicle.
Figure 3:
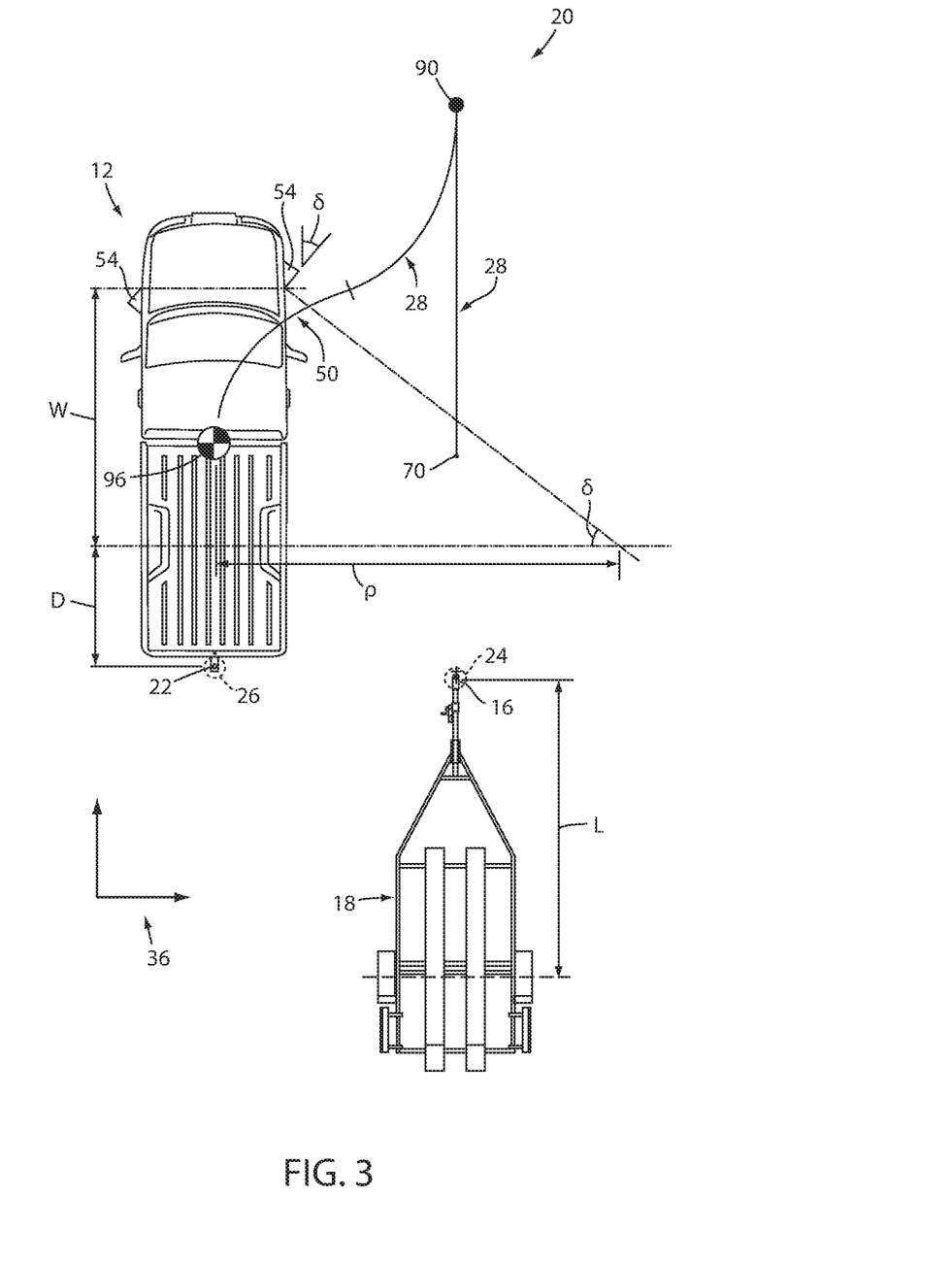
FIG. 3 is an overhead schematic view of a vehicle during a step of the alignment sequence with the trailer.
Figure 4:
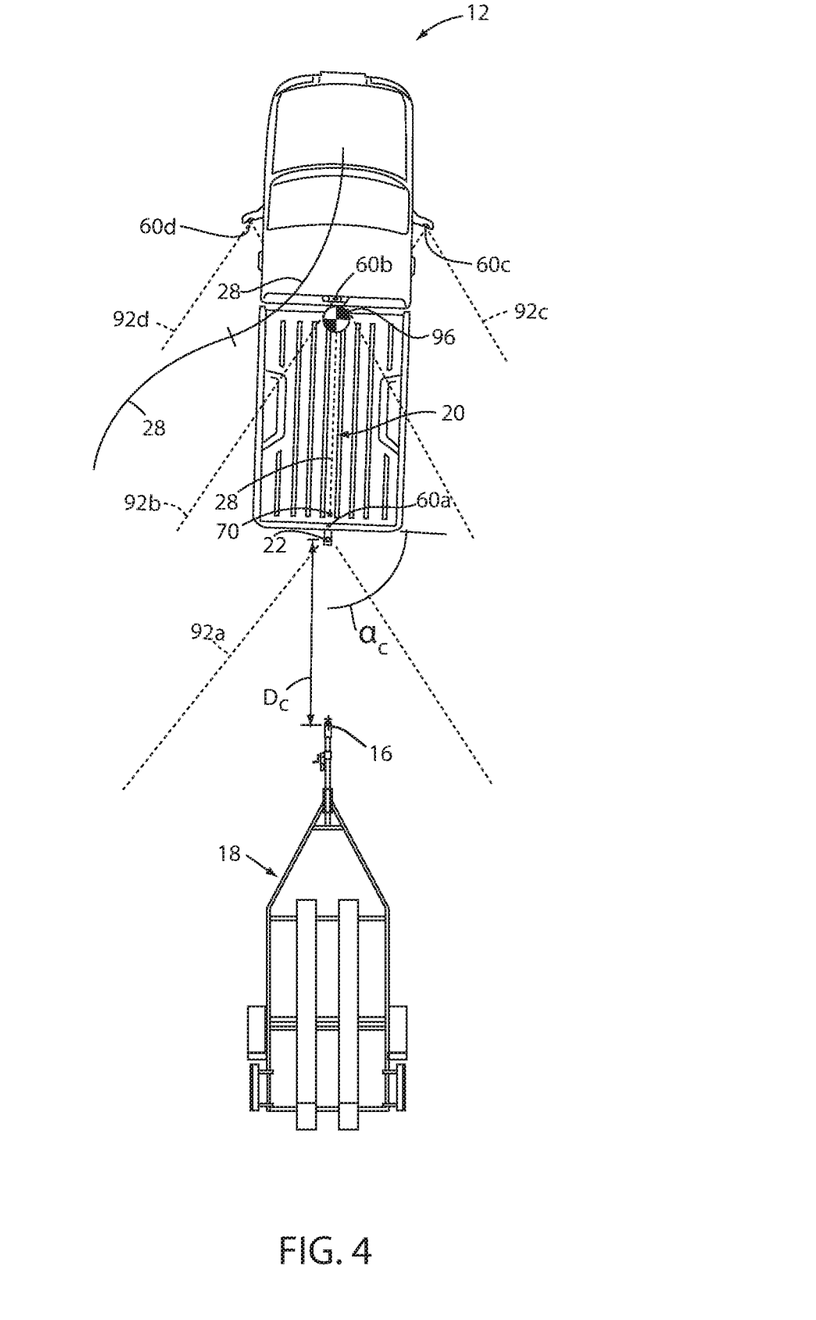
FIG. 4 is a is an overhead schematic view of a vehicle during a step of the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle $\delta$ as shown in FIG. 3. Other vehicle information received by hitch assist system 10 may include a speed of the vehicle 12 from a speed sensor 38 and a yaw rate of the vehicle 12 from a yaw rate sensor 40. It is contemplated that in additional embodiments, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height H and position (e.g., based on the distance $D_c$ and angle $\alpha_c$) of coupler 16.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle $\delta$. In the illustrated embodiment, the power assist steering system 50 is an electric power-assisted steering ("EPAS") system including electric steering motor 52 for turning the steered wheels 54 to a steering angle $\delta$ based on a steering command, whereby the steering angle $\delta$ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering.

More specifically, a torque sensor 58 is provided on the power assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from movement of the steered wheels 54 of such a vehicle.

With continued reference to FIG. 2, the power assist steering system 50 provides the controller 14 of the hitch assist system 10 with information relating to a rotational position of steered wheels 54 of the vehicle 12, including a steering angle δ. The controller 14 in the illustrated embodiment processes the current steering angle, in addition to other vehicle 12 conditions to guide the vehicle 12 along the desired path 20 (FIG. 3). It is conceivable that the hitch assist system 10, in additional embodiments, may be an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly in operation, the controller 14 may be configured to control the brakes 62a and 62b as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a collision with trailer 18, and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated collision with a portion of trailer 18. The powertrain control system 64, as shown in the embodiment illustrated in FIG. 2, may also interact with the hitch assist system 10 for regulating speed and acceleration of the vehicle 12 during partial or autonomous alignment with trailer 18. As mentioned above, regulation of the speed of the vehicle 12 may be advantageous to prevent collision with trailer 18.

As previously discussed, the hitch assist system 10 may communicate with human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some embodiments, the indicator devices 78 may further include one or more accessories 78d, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

System 10 may also incorporate the imaging system 60 that includes one or more exterior cameras 60a-60d. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which in the depicted arrangement include fields of view 92a, 92b, 92c, and 92d to correspond with rear camera 60a, center high-mount stop light (CHMSL) camera 60b, and side-view cameras 60c and 60d, respectively. In this manner, image data from two or more of the cameras 60a-60d can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60a, 60b, 60c, and 60d within imaging system 60. In either example, the image processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, image processing routine 86 may be programmed with identifying characteristics of the marker for location in image data, as well as the positioning of coupler 16 relative to such a marker so that the position 24 of coupler 16 can be determined based on the marker location.

Additionally or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above described use of image data. Alternatively, the user U can visually determine the position 24 of coupler 16 within an image presented on HMI 66 and can provide a touch input in a manner similar to that which is described in commonly-assigned U.S. Pat. No. 10,266,023, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60c and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information can then be used in light of the position 24 of coupler 16 within the field of view 92c of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta}, \quad (1)$$

in which the wheelbase W is fixed and the steering angle δ can be controlled by controller 14 by communication with steering system 50, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}. \quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22 with coupler 16.

As discussed above, hitch assist system 10 can provide image data to image processing routine 86 that can be used by image processing routine 86 (by the process described above or by other available processes) to determine the height $H_b$ of hitch ball 22 (i.e., a vertical component of the data including the position 24 of coupler 16. The image data may be captured by one or more of the cameras 60*a-d* of the imaging system 60. Further, hitch assist system 10 can have stored in memory 84 or can otherwise determine the height $H_b$ of hitch ball 22. In one example, during an initial setup routine for hitch assist system 10, a user U can be prompted to install hitch ball 22 by way of assembling a ball mount including hitch ball 22 with a receiver positioned on the rear of vehicle 12. The user U can then be asked to measure the height $H_b$ of the hitch ball 22 (such as to the top or center thereof) and to enter that measurement into memory 84 by way of HMI 66, for example. In this manner, a number of different height measurements for a plurality of hitch balls used in connection with the particular vehicle 12 can be stored in memory 84 and can be selected by the user U. In some embodiments, hitch ball 22 may be within the field of view 92*a* of rear camera 60*a* such that image data can be processed to determine the height $H_b$ of hitch ball 22 on a real-time or on-demand basis.

Figure 5:
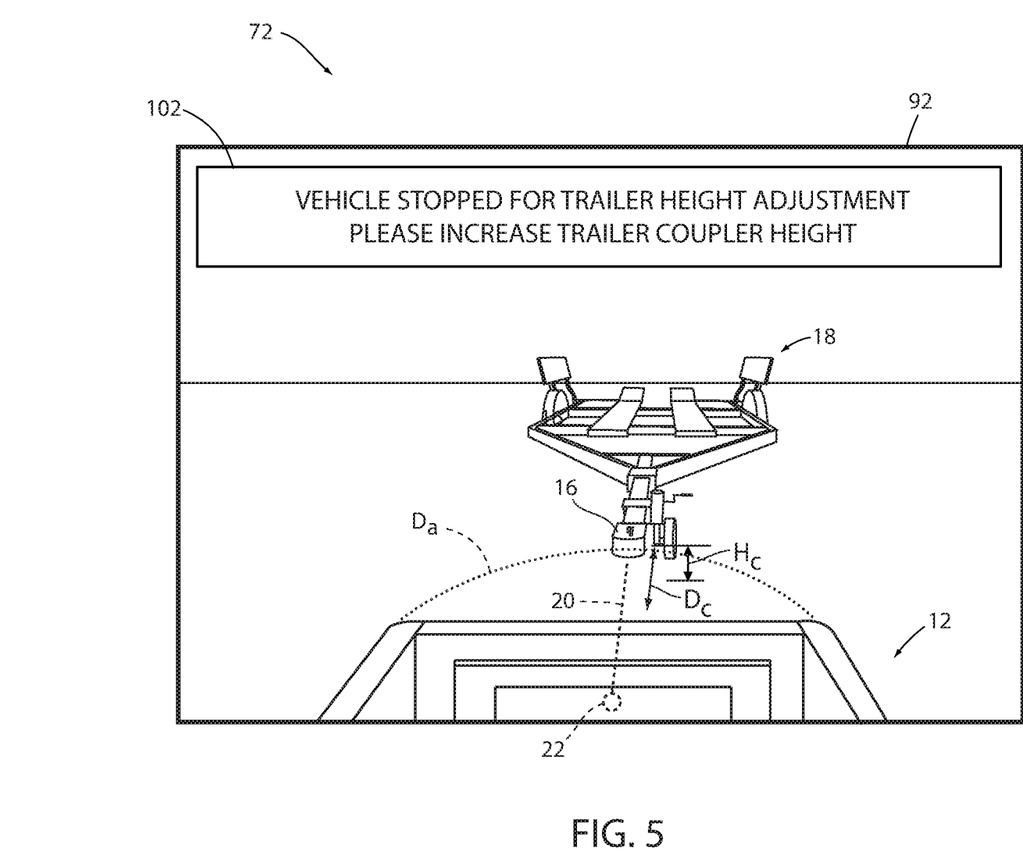
FIG. 5 is a is a projected view of image data demonstrating an alignment sequence with the trailer.

Referring to FIGS. 5 and 6, as previously discussed, the hitch system 10 may be configured to control or guide the user U through a hitch adjustment routine. For example, as the controller 14 navigates the vehicle 12 along the vehicle path 20, the controller 14 may identify the height of the coupler 16 to identify whether the coupler 16 is compatible or the height is adequate to clear the height $H_b$ of the hitch ball 22. Accordingly, the hitch assist system 10 may be configured to stop the vehicle at a predetermined adjustment distance $D_a$ and provide instructions to the user U to adjust the height $H_c$ of the coupler 16.

Referring to FIG. 5, the controller 14 may process the image data we received from the imaging system 60 and display one or more of the fields of view 92 on the display 72 of the vehicle 12. In response to the proximity of the coupler 16 to the hitch ball 22 being within the adjustment distance $D_a$, the controller 14 may stop the vehicle 12 and display an instruction 102 on the display 72. The instruction 102 may prompt the user U to adjust the height $H_c$ of the coupler 16. The instruction 102 may also or similarly be communicated to the user U as an audible instruction via an audio system of the vehicle 12 for various signals or indications, which may be communicated to the user U via the indicator devices 78. In this way, the controller 14 may be configured to instruct the user U to adjust the height $H_c$ of the coupler 16.

Referring again to FIGS. 5 and 6, the adjustment distance $D_a$ may correspond to a predetermined coupler distance $D_c$. Accordingly, in operation, the user U may exit the vehicle 12 and approach the trailer jack 30 to adjust the height $H_c$ of the coupler 16. In some embodiments, the controller 14 may monitor the adjustment of the height $H_c$ of the coupler 16 and be configured to identify a change in coupler height $\Delta H_c$ over which the height $H_c$ of the coupler 16 must be adjusted. In response to identifying changes in the height $H_c$ of the coupler 16, the controller 14 may further output indications or feedback to the user U identifying whether the height $H_c$ of the coupler 16 is being changed in a correct direction or has been changed sufficiently such that the height $H_c$ is greater than the height $H_b$. The feedback or indications may be communicated by the controller 14 to the user U via the indicator devices 78. In this way, the controller 14 may provide the user U with useful feedback identifying whether or not the height $H_c$ of the coupler 16 is being adjusted correctly and/or whether an adjustment of the height $H_c$ is complete.

As previously discussed, the indicator devices 78 may comprise the vehicle horn 78*a*, lights 78*b*, a speaker system 78*c* (e.g., a stereo system), and various vehicle accessories 78*d*. Accordingly, the feedback may be provided by the controller 14 to the user U in a variety of ways. For example, the controller 14 may activate the vehicle horn 78*a* to output a tone or predefined sound pattern (e.g., one beep or two beeps) to indicate that the adjustment of the height $H_c$ is in the correct direction and/or complete. Similarly, the controller 14 may control the lights 78*b* to illuminate identifying the progress or completion of the adjustment of the height $H_c$ and/or activate in one or more predefined patterns. Each of the indications may be programmed to indicate or correct an adjustment direction and/or a completion of the adjustment of the height $H_c$ of the coupler 16. In some embodiments, the controller 14 may also provide audible instructions via the speaker system 78*c*. For example, the controller 14 may control the speaker system 78*c* to output one or more prerecorded messages (e.g., "wrong direction," "correct direction," "height adjustment complete") to provide feedback to the user U during the adjustment of the height $H_c$ of the coupler 16.

In some embodiments, the controller 14 may communicate feedback to the user via the HMI 66, the display 72, and/or the portable device 80. For example, when the user U has exited the vehicle 12, the user U may carry the portable device 80 and receive communications from the controller 14 identifying the progress of the height adjustment of the coupler 16. Such updates may be also provided by the controller 14 to the display 72. Accordingly, the controller 14 may provide feedback to the user U throughout the height adjustment routine via a variety of devices and methods to promote easy and effective adjustment of the height $H_c$ of the coupler 16.

Figure 7:
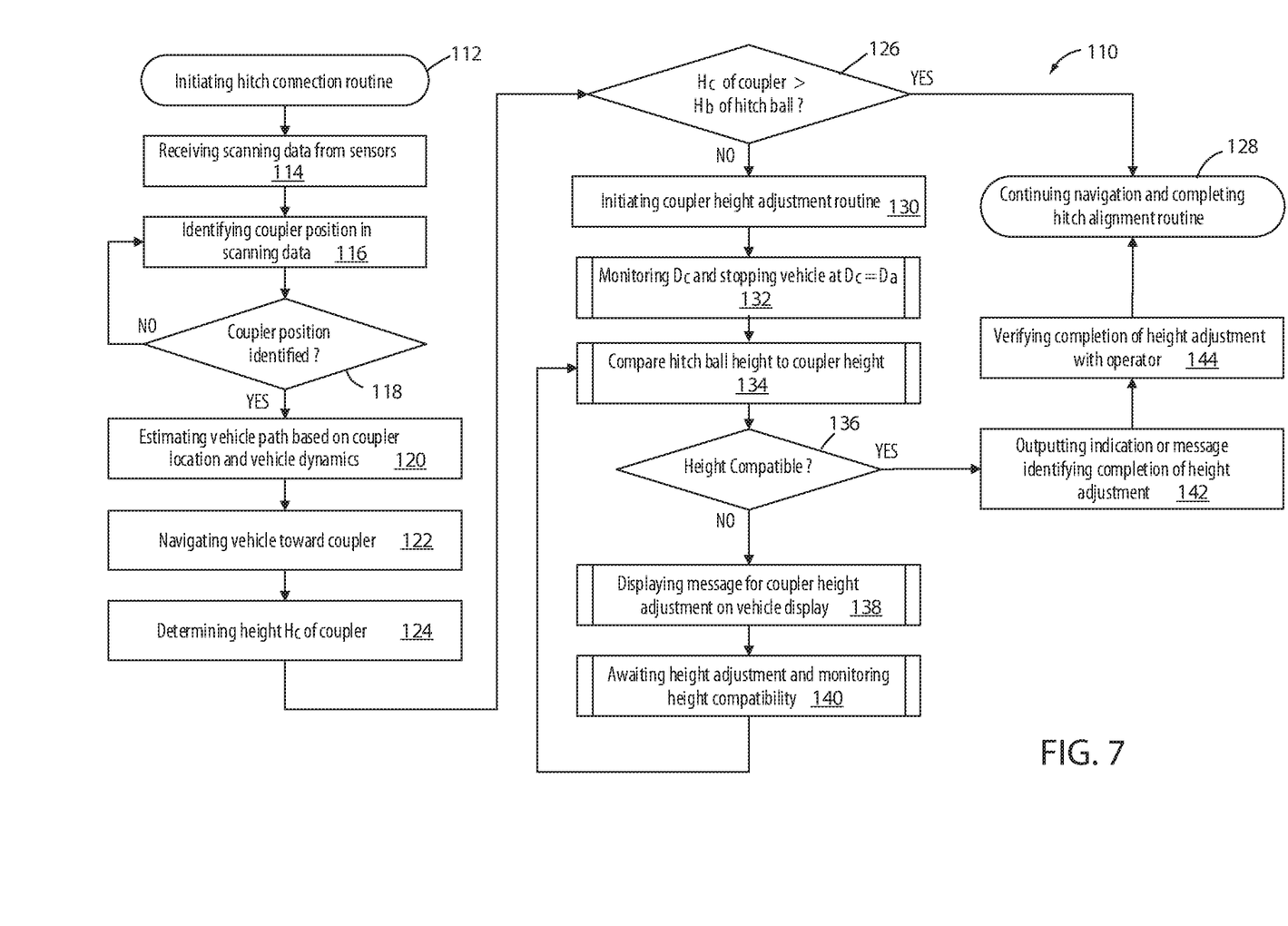
FIG. 7 is a flow chart demonstrating a method to detect a height of the coupler and adjust the height for attachment to the hitch ball in accordance with the disclosure.

Referring now FIG. 7, a flowchart of the method 110 for applying the hitch adjustment routine is discussed in further detail. The method 110 may begin by initiating the hitch connection routine (112). As previously discussed, the hitch connection routine (112) may comprise controlling the imaging system 60 to capture image data. The controller 14 may receive the image data and scan the data from the sensors (e.g., the camera system 60) (114). With the scanning data or image data received, the controller 14 may identify the coupler position 24 (116). In step 118, if the coupler position 24 is identified, the method 110 may continue to estimate the vehicle path 20 based on the coupler position 24 and the dynamics of the vehicle 12 (120). If the coupler position 24 is not identified in step 118, the method 110 may return to step 116 to attempt to identify the coupler position 24.

With the vehicle path 20 identified for the hitch connection routine, the controller 14 may continue by navigating the vehicle 12 (e.g., the hitch ball 22) toward the coupler position 24 (122). While navigating the vehicle 12 toward the coupler 16, the controller 14 may continue by determining the height $H_c$ of the coupler 16 (124). The height $H_c$ of the coupler 16 may also be determined when the coupler position 24 is identified in step 116. In step 126, the controller 14 may compare the height $H_c$ of the coupler 16 to the height $H_b$ of the hitch ball 22. If the height $H_c$ of the coupler 16 is greater than the height $H_b$ of the hitch ball 22, the controller 14 may continue the navigation of the vehicle 12 and complete the hitch connection routine by aligning the hitch position 26 with the coupler position 24 (128). If the height $H_c$ is not greater than the height $H_b$ in step 126, the controller 14 may continue to initiate the coupler height adjustment routine (130).

The coupler height adjustment routine 130 may begin by monitoring the coupler distance $D_c$ and stopping the vehicle 12 when the coupler distance $D_c$ is approximately equal to the adjustment distance $D_a$ (132). Once the vehicle 12 is stopped at approximately the adjustment distance $D_a$, the controller 14 may control the brake control system 62 to apply the service brakes 62a and/or the parking brake 62b to hold the position of the vehicle 12 at the adjustment distance $D_a$. Throughout the height adjustment routine 130, the controller 14 may continue to compare the height $H_c$ of the coupler 16 to the height $H_b$ of the hitch ball 22 (134). Additionally, in step 136, the controller 14 may compare the height $H_c$ of the coupler 16 to determine if the height is compatible to clear the height $H_b$ of the hitch ball 22. In response to the height $H_c$ of the coupler 16 being less than the height $H_b$ of the hitch ball 22, the controller 14 may continue by displaying a message on the display 72 instructing the user U to complete a height adjustment (138). Following the prompt on the display 72, the height adjustment routine 130 may continue by monitoring the height compatibility and communicating feedback to the user U via the display 72, the indicator devices 78 and/or the portable device 80 (140). As previously discussed, the feedback may be communicated to the user U as a variety of indications and/or messages which may be displayed or communicated as visual or audible communications via various systems in communication with the hitch assist system 10.

Through step 140, the controller 14 may continuously compare the height $H_c$ of the coupler 16 to determine the height compatibility in step 136. If the height $H_c$ of the coupler 16 is compatible in step 136, the controller 14 may continue by outputting an indication or message identifying the completion of the height adjustment routine 130 (142). Upon completion of the height adjustment routine 130, the controller 14 may further prompt the user U to verify the completion of the height adjustment routine 130 via the HMI 66 and/or the portable device 80 (144). Once the completion of the height adjustment routine 130 is verified in step 144, the method 110 may continue to step 128 to complete the hitch connection routine. Accordingly, the hitch assist system 10 as described herein may provide for a simple and intuitive procedure to adjust the height $H_c$ of the coupler 16 and ensure that the height $H_c$ is compatible to connect the coupler 16 of the trailer 18 to the hitch ball 22 of the vehicle 12.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle system, comprising:
a controller that:
identifies a coupler position of a coupler of a trailer;
controls motion of the vehicle completing an alignment of a hitch ball with the coupler position;
monitors a coupler height of the coupler relative to the hitch ball;
stops the motion of the vehicle in response to the coupler height being less than a hitch height of the hitch ball;
in response to the vehicle stopping, monitors the coupler in response to a manual adjustment of the coupler height;
in response to the manual adjustment of the coupler height, identifies a direction of the manual adjustment; and
outputs an adjustment instruction in response to the direction of the manual adjustment, wherein the adjustment instruction identifies whether the direction of the manual adjustment adjusts the coupler height to be compatible for connection to the hitch ball.

2. The system according to claim 1, wherein the controller further stops the vehicle at a predetermined distance from the trailer.

3. The system according to claim 1, further comprising an indication device, wherein the controller controls the indication device to output a notification indicating the coupler height.

4. The system according to claim 3, wherein the controller is in communication with a portable device and configured to wirelessly communicate the notification for display on a screen of the portable device.

5. The system according to claim 3, wherein the indication device comprises a display screen in communication with the controller, wherein the controller outputs an instruction displayed on the display screen indicating the coupler height relative to the hitch height of the hitch ball on the display screen.

6. The system according to claim 3, wherein the indication device comprises at least one of a light source, an audible apparatus, and a display screen.

7. The system according to claim 1, wherein the controller further controls the motion of the vehicle completing the alignment in response to receiving an input indicating that the manual adjustment is complete.

8. The system according to claim 1, wherein the controller controls the motion of the vehicle completing the alignment of the hitch ball with the coupler position in response to identifying that the coupler height is compatible with the hitch height of the hitch ball for connection.

9. The system according to claim 1, further comprising:
a sensor apparatus in communication with the controller, wherein the sensor apparatus scans a region proximate the vehicle and the controller detects the coupler position of the coupler of the trailer.

10. The system according to claim 9, wherein the sensor apparatus comprises an imaging system including one or more cameras mounted on the vehicle; and
wherein:
the controller identifies the coupler position based on image data received from the imaging system comprising position data of the coupler.

11. A method for controlling a vehicle comprising:
identifying a coupler position including a coupler height of a trailer in sensor data;
controlling motion of the vehicle aligning a hitch ball of the vehicle with the coupler position;
stopping the motion of the vehicle at a predetermined distance from the coupler position;
outputting an instruction for adjusting the coupler height;
monitoring the coupler height identifying a height compatibility between a hitch height of the hitch ball and the coupler height, wherein the monitoring comprises monitoring the coupler height during a manual adjustment of the coupler height;
identifying an adjustment direction of the manual adjustment; and
in response to the adjustment direction, outputting an adjustment instruction indicating feedback regarding the adjustment direction, wherein the adjustment instruction indicates whether the adjustment direction will result in the coupler height being greater than the hitch height.

12. The method according to claim 11, wherein an indication is wirelessly communicated to a portable device outputting the indication outside the vehicle.

13. The method according to claim 11, further comprising:
capturing image data scanning of a region proximate the vehicle, wherein the coupler height is identified based on the image data.

14. A vehicle system, comprising:
a hitch receiver of a vehicle;
a sensor system configured to capture sensor data comprising a coupler position of a trailer;
an indication device; and
a controller that:
identifies the coupler position from the sensor system;
controls motion of the vehicle aligning a hitch ball with the coupler position;
monitors a coupler height of the coupler relative to a hitch height of the hitch ball;
stops the motion of the vehicle in response to the coupler height being less than the hitch height of the hitch ball;
identifies a direction of an adjustment of the coupler height based on the sensor data;
monitors the direction of the manual adjustment in response to the adjustment; and
in response to the direction of the adjustment, outputs an adjustment instruction indicating feedback regarding the adjustment, wherein the adjustment instruction communicates an indication whether the direction of the adjustment changes the coupler height to be compatible for connection to the hitch.

15. The system according to claim 14, wherein the controller further:
receives an input via a user interface indicating a selection of a hitch ball, wherein the selection identifies a measurement of the hitch ball, wherein the manual height adjustment of the coupler height comprises a physical adjustment of the coupler height that is monitored by the controller based on changes in the sensor data.

16. The system according to claim 15, wherein the controller further:
accesses the measurement of the hitch ball indicating a hitch height.

* * * * *